(12) United States Patent
Hartland

(10) Patent No.: US 8,619,496 B2
(45) Date of Patent: Dec. 31, 2013

(54) CONNECTING DEVICE FOR WIDE TOW SURVEY

(75) Inventor: Martin Hartland, Houston, TX (US)

(73) Assignee: Fugro-Geoteam AS., Oslo (NO)

( * ) Notice: Subject to any disclaimer, the term of this patent is extended or adjusted under 35 U.S.C. 154(b) by 0 days.

(21) Appl. No.: 13/817,311

(22) PCT Filed: Aug. 17, 2011

(86) PCT No.: PCT/EP2011/064118
§ 371 (c)(1),
(2), (4) Date: Apr. 11, 2013

(87) PCT Pub. No.: WO2012/022757
PCT Pub. Date: Feb. 23, 2012

(65) Prior Publication Data
US 2013/0215713 A1    Aug. 22, 2013

(30) Foreign Application Priority Data
Aug. 20, 2010   (EP) .................................. 10173615

(51) Int. Cl.
*G01V 1/38* (2006.01)
*B63B 1/24* (2006.01)

(52) U.S. Cl.
CPC ............... *G01V 1/38* (2013.01); *G01V 1/3843* (2013.01); *B63B 1/242* (2013.01)
USPC ........................................ 367/15; 114/253

(58) Field of Classification Search
USPC ................. 367/15, 16; 114/249, 253
See application file for complete search history.

(56) References Cited

U.S. PATENT DOCUMENTS

| | | | |
|---|---|---|---|
| 4,574,723 A | 3/1986 | Chiles et al. | |
| 7,404,370 B2 | 7/2008 | Stokkeland | |
| 7,577,060 B2 | 8/2009 | Toennessen et al. | |
| 8,351,294 B2 | 1/2013 | Stokkeland et al. | |
| 2012/0125249 A1* | 5/2012 | Oxseth et al. ................. | 114/253 |

FOREIGN PATENT DOCUMENTS

| | | |
|---|---|---|
| GB | 2122562 A | 1/1984 |
| GB | 2414804 A | 7/2005 |
| GB | 2415675 B | 2/2009 |
| GB | 2452148 A | 2/2009 |
| NO | 311856 A | 2/2002 |
| NO | 20073824 A | 2/2008 |
| NO | 20083173 A | 2/2009 |
| WO | 2010/009249 A2 | 1/2010 |

OTHER PUBLICATIONS

International Search Report mailed on Oct. 13, 2011 in corresponding international application No. PCT/EP2011/064118.

* cited by examiner

*Primary Examiner* — Krystine Breier
(74) *Attorney, Agent, or Firm* — Patent Portfolio Builders PLLC

(57) ABSTRACT

Marine seismic survey using an array (6) of streamers (8) towed behind a vessel (2) and carrying acoustic sources (4) and sensors (10), spreading means (12, 14, 22, 23, 24) for keeping the streamers (8) at a given distance by lateral tensioning, and bridles (16) for connecting the spreading means and towing ropes and cables. The bridles (16) are comprising at least one solid link or connection device (26) for releasable connection to lines under tension and extending in different directions.

17 Claims, 1 Drawing Sheet

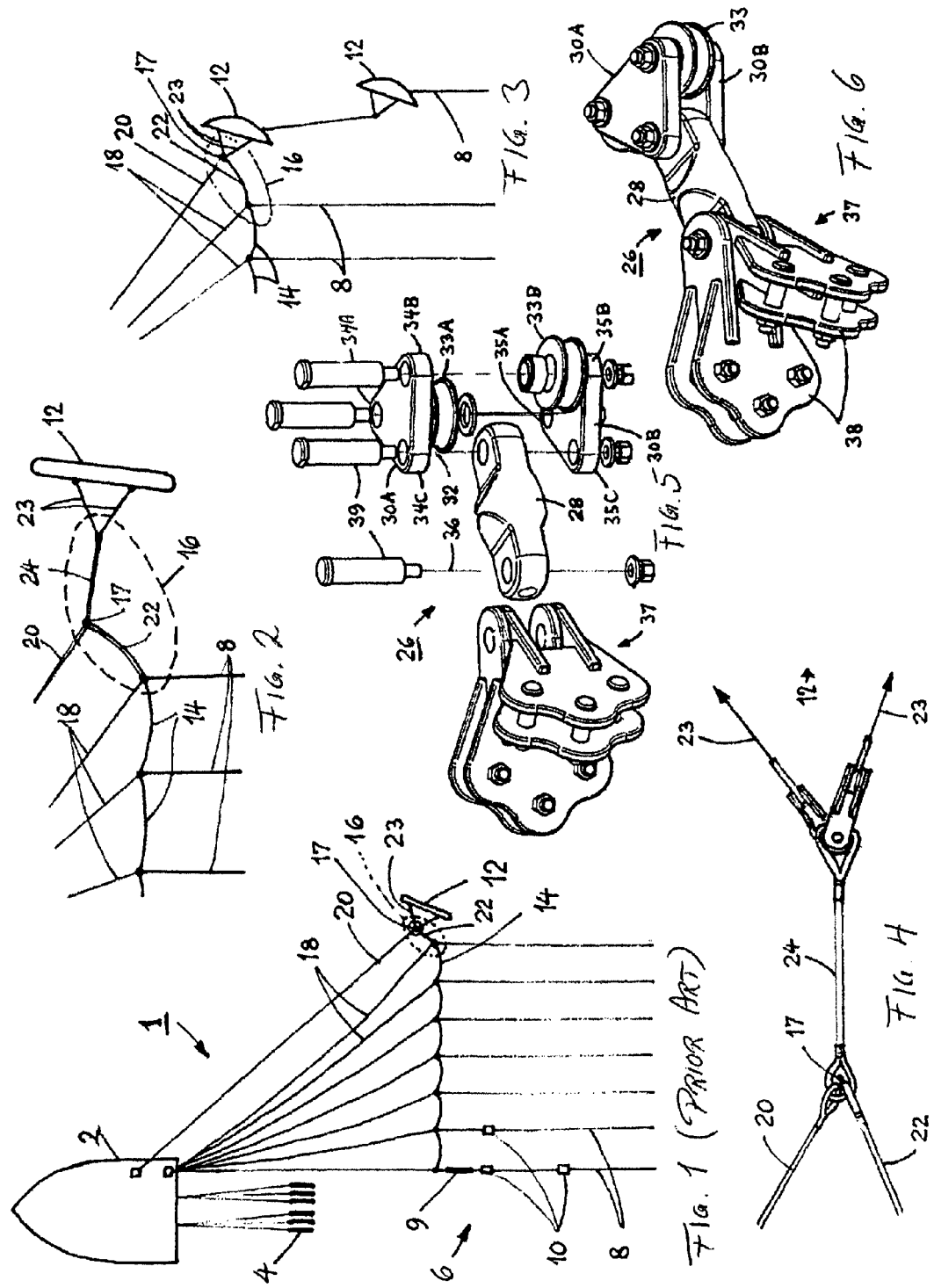

CONNECTING DEVICE FOR WIDE TOW SURVEY

TECHNICAL FIELD

The present application is in the field of marine seismic exploration or survey of geological sub sea formations that may contain hydrocarbon deposits. In particular the application, in the following also called the invention, is directed to seismic equipment comprising an array of trailing survey lines carrying acoustic sources and sensors, ropes and cables for the towing of said array behind a vessel, as well as the connections at the end of said ropes and cables.

With the expression "rope" is in the present context to be understood lines, wires, ropes or cords normally suited for towing under tension and without facilities for also carrying electric power, digital, analogue or optical signals or fluid; while cables may have those additional facilities.

BACKGROUND AND PRIOR ART

Three dimensional (3D) marine seismic surveys are surveys conducted in marine environments, both in the saltwater sea (offshore) and fresh and brackish waters. A typical survey of this kind deploys at least one acoustic source and corresponding sensors at given mutual distances, in a survey arrangement like the one belonging to prior art and illustrated in FIG. 1 of the accompanying drawings. The arrangement comprises a vessel 2, towing lines 18, 20 and connections, and a group or array 6 of trailing survey cables usually called streamers 8 and carrying the acoustic source(s) 4 and sensors 10. Acoustic pressure waves from each source 4, which propagate downwardly through the water into the geological formations, are reflected as shear and pressure waves from the various structures and interfaces of same and may reach the sensors 10 at detectable levels. A subsequent conditioning and processing of the detected waves then convert them to seismic data, to be analysed for the possible indication of locations of hydrocarbon deposits.

A common marine survey is conducted by using such a towed array 6 of parallel streamers 8 that follow fairly straight lines backwards from the vessel 2 stern. Each streamer normally carries a large number of acoustic sensors 10 or receivers, usually called hydrophones. The length of the streamers is today often in the range 600-12 000 m, and their number may be from two to more than twenty.

In conventional seismic towed-array surveys the streamers are commonly held some 50-100 m apart during towing, which has been found convenient with respect to the covered survey area and the compromise between the detection of reflected waves and the discrimination and suppression of linear noise overlaying the detected and processed acoustic signals. The total number of seismic streamers is also constrained by the towing capacity of the vessel.

An alternative to the conventional seismic array is the one called the "wide tow" array in which the maximum value of the streamer spacing, according to the theory of discrete sampling, is exceeded. The corresponding reduced density of the detection signals is in this case compensated by inter/extrapolation, so that a seismic data density fairly close to the level known from the conventional towed-array survey is achieved. In addition one gets the benefit of technical advantages as well as lower costs, partly due to fewer vessel passes for a given survey coverage. A specific such advantage is that the incidence angles of the acoustic wave are allowed to be wider, both at the reflecting formation structures and the streamer hydrophones.

Between the winch for launching and rewinding on board the vessel and the streamers in position in the sea there are provided so called lead-in cables 18. These cables are usually of the triple layer armoured type and designed to withstand the rough conditions often met at the forward end of the streamer array. The cables 18 are adapted for the combined supplying of electric power to the sources and sensors along the streamers, transferring signals and pulling by towing, so as to deploy the streamers from the seismic vessel 2 and maintain the streamers 8 at a selected mutual lateral distance behind it. Further is often used a stretchable rope or streamer section 9 at the forward and in case also the aft end of each streamer 8 for taking up tugging forces in heavy sea.

In order to provide separation of the streamers at both ends, deflection devices 12 setting up opposite lateral forces ("lift" and drag) are used. These devices are called paravanes and act as the well known fishing tackle otter. They are kept at an angle to the towing direction of the array 6, so as to produce a separating ("lateral lift") force due to the movement in the water. The forward paravanes 12 (only one such is illustrated in FIG. 1) may have a separating (or lift) capacity in the order of 150 kN—equivalent to a weight of 15 tons—and a surface area of up to 40 $m^2$. Each paravane is connected to primarily the outermost one of the lead-in cables 18, usually indirectly through a laterally outermost part 22 of a "super wide" rope 14, 22, also called spreader rope or cable, to which the streamers 8 are fixed near their forward ends. The super wide rope extends transversely to the direction of motion of the vessel 2, thereby forming tethers 14 between each two streamers. When the super wide rope is maintained at a correct tension, these tethers 14 substantially fix the relative lateral positions of the forward ends of the streamers. The paravane is as well connected to a corresponding outermost tow-in rope 20 which, together with the part 22 and their connections to each other and to the paravane 12 form a local rope array or assembly often bearing the name bridle 16 and partly including the wires or ropes 23 fixed to the paravane body. At least one of the connections within said bridle 16 is serving as a force converging point 17 (see FIG. 1). The connections, and in particular the one representing the converging point 17, are normally heavy fixed assemblies that during the survey are held just below the water surface.

Besides, it is naturally that the most suitable configuration for said bridle 16 or rope array that ultimately couples the paravane to the super wide rope 14, 22 and/or the tow-in rope 20 may vary depending on the particular paravane used, and on actual vessel motion conditions.

Prior art is abundantly represented by patent documents, of which a few ones covering streaming arrays and paravane systems are listed below:

GB 2 415 675, our own NO 99 6452, NO 2007 3824—PGS, NO 2008 3173, NO 2009 0530—Geco, U.S. Pat. No. 4,574,723 and U.S. Pat. No. 7,577,060.

The normal or typical survey speed of vessels towing a multiple streamer array of the conventional "narrower" type is today 7.5-10 km/h (4-5 knots), primarily limited by the transverse forces acting on the lead-in cables 18, in particular the outermost ones, as well as the tow ropes 20, often named "spur lines", as these cables and ropes have the widest angle relative to the vessel heading and towing direction. Secondarily, but as important, is the coupling between said outermost lead-in cables 18 and spur lines 20, and the super wide rope 14, 22 in the transverse direction and connected to the forward end of the streamers 8.

Still more demanding in this respect is the wide tow array having an extended streamer spacing and/or a greater number of streamers and thereby a larger width and corresponding wider lead-in angles, and it is evident that both the paravanes and the bridles then have to be dimensioned accordingly.

FIG. 2 of the drawings illustrate another version of the bridle 16 centred on the force converging point 17, in that a connecting rope 24, often named "lever arm", is inserted between said converging point and the paravane 12 through its fastening wires or ropes 23. The dimensioning of said lever arm rope 24 has traditionally called for a high strength man-made fibre rope of inter alia the Dyneema® brand, at a length between 3 and 30 m, as this rope is to be regarded as a crucial element for the entire seismic array 6. The working load of—or the tension in—said element is in fact found to occasionally exceed twice the value of that of the spur lines 20 and may reach forces equivalent to 100 tons or more.

In addition the fibre lever arm rope 24 of today can be regarded to be quite vulnerable in the sea, i.e. regarding overstretching, fatigue rupture and damage due to possible contact with parts of fishing lines etc., even more as such contacts more easily lead to failure when such a rope or similar is under great tension.

Moreover are typically used so called soft splices for the lever arm rope 24 connections at both ends, due to that the survey array 6 normally has to be recovered over an overboard sheave. So, even if the lever arm rope—in particular in a wide tow survey array—turns out to be the most severely loaded element in said array, in fact having to withstand forces of the kind and order mentioned above, "soft" and vulnerable components of limited strength and life expectancy are today apparently still the best choice.

The continuous need for improvements to increase the seismic survey efficiency has however led to attempts for using a component suited for more solid connections than said soft splices, as this seemed near at hand for the developing professional. However, this idea was abandoned and did not find practical use due to the apparent greater risk for damaging the winch/sheave mechanism.

On the background of this, the objective of the invention was to find a better overall solution to this problem, namely reducing or eliminating the risk of damaging the sheave and corresponding mechanisms, but at the same time strengthening the bridle components, in order to obtain a much longer and more predictable life time with respect to fatigue and damage by contact, an easier assembly and disassembly, possible lower costs and generally more failure safety.

SUMMARY OF THE INVENTION

It is believed that such a solution really is found, primarily by introducing a solid connecting device in the form of a link or member for replacing the "soft" fibre version of the lever arm rope 24, as disclosed in the appended patent claims.

According to the invention said objective is achieved by an apparatus employing seismic equipments as stated in the introduction, and having the characteristic features stated in the independent claim 1. Advantageous embodiments of the invention are stated in the dependent claims 2-10. Furthermore, the invention also covers a method employing said apparatus, and having the characteristic features stated in the independent claim 11. Advantageous embodiments of the method according to the invention are stated in the dependent claims 12 and 13.

More specifically, a marine seismic survey arrangement is disclosed employing seismic equipment comprising an array of trailing survey lines carrying acoustic sources and sensors, towing means for the towing of said array behind a vessel, and spreading means for keeping the survey lines of the array at a given mutual distance by lateral tensioning, bridle means for connecting the spreading means and the towing means in an appropriate way, wherein said bridle means comprising at least one solid link device designed for a releasable connection to lines under tension and extending in different directions.

Further the device is being adapted for a releasable connection to lines in the form of high strength man-made fibre ropes of a commercially available brand.

Still further the device is—where said spreading means comprise paravanes and fastening ropes fixed thereto, and a super wide or spreading rope having a plurality of tethers and an outermost part extending into the bridle means, and where the towing means comprise an outermost tow rope or spur line—being adapted for the insertion into/the replacement of a connection representing a force converging point, between the outermost part of the spreading rope, the outermost tow rope and the paravane fastening ropes, thereby establishing a releasable link giving a connection distance less than 1.5 m, more preferably less than 0.75 m, most preferably less than 0.5 m, distinctive for the device, and at the same time providing an easier releasing, greater strength and reliability.

Still further the device is—where said spreading means comprise paravanes and fastening ropes fixed thereto, a super wide or spreading rope having a plurality of tethers and an outermost part extending into the bridle means, and a lever arm rope—being adapted for the replacement of the lever arm rope, thereby reducing the connecting distance from between 3 and 30 m, distinctive for said rope, down to a value less than 1.5, more preferably less than 0.75 m, or most preferably less than 0.5 m, distinctive for the device, and at the same time providing an easier releasing, greater strength and reliability.

Particularly the device according to the invention comprises a central bar having at one end at least one rotatable plate carrying at least one sheave and adapted for the insertion of eye splices or the like, and at the other end a hinged multiple fastener adapted for the fastening of paravane ropes or the like, thereby allowing the bar to align with the sum of the vector forces from the connected ropes or cables at either bar end, and it may further comprise two triangular plates at one end, said plates carrying two sheaves there between and adapted for the fastening of an outermost towing cable and the outermost tow rope, both belonging to said towing means, and that the hinged multiple fastener at the other end is of the clevis type and comprises two rope clamps, each adapted for the fastening of one of at least two paravane ropes.

Alternatively the device can comprise two triangular plates at one end, said plates carrying two sheaves there between, the one of which being adapted for the fastening to the outmost part of the spreading rope while the second one being adapted for the fastening to the aft end of said outermost towing cable, and that the hinged multiple fastener at the other end of the device is of the clevis type and comprises two rope clamps, each adapted for the fastening of a tether and a steamer, respectively.

The invention also covers a method for employing a couple of devices of this kind by inserting one such device into a connection representing a force converging point, or replacing said connection with said one device, for establishing a releasable link between said point at a first location in a bridle, and the fastening ropes of the paravane, and also inserting another such device into a connection between the spreading rope and the aft end of an outermost towing cable of the towing means and a streamer, respectively, or replacing said connection with said another device, for also establishing a releasable link at a second location in the bridle, from the spreading rope to the end of said cable.

In an alternative method a couple of devices are employed by replacing the lever arm rope by one such device at a first location in a bridle, thereby reducing the connecting distance from between 3 and 30 in, distinctive for said rope, down to a value less than 1.5 m, more preferably less than 0.75 m, most preferably less than 0.5 m, distinctive for the device, and also inserting another such device into a connection between the spreading rope and the aft end of an outermost towing cable of the towing means, and a streamer, respectively, or replacing said connection with said another device, for also establishing a releasable link at a second location in the bridle, from the spreading rope to the end of said cable.

Finally a method according to the invention covers the insertion in/replacing connections or ropes that at the aft end of the array correspond to similar ones at the forward end of said array, for better to withstand tensile forces in bridles at said aft end.

Said device can be made of a standard material like high quality steel to withstand great tension forces from varying directions, in a fairly simple design. Two pivot axis and rotatable sheaves between massive supporting plates make the insertion of a simple but strong eye splice easy for connecting both the outermost part 22 of the super wide rope and the tow rope or spur line 20 at one end and the paravane fastening ropes 23 at the opposite end, such as by using a clevis arrangement.

The use of a short link device of this kind for replacing the earlier rope version of said lever arm 24 gives a stable setup for the paravanes 12 of the survey array 6, at a position in the bridle 16, and the recovering problem will be overcome, as the paravane 12 can be hoisted up to an actual point for the winch for the super wide rope 14, 22.

THE DRAWINGS AND A DETAILED DESCRIPTION OF THE INVENTION

The invention is described generally and in further detail below, and the description is—as in the introduction—supported by the accompanying drawings, so as to contribute to a good understanding of the invention. Reference numerals given in the description are corresponding to like numerals in the drawings, wherein:

FIG. 1 depicts schematically a prior art marine seismic survey arrangement of a fairly wide tow type, in a version where the forward paravanes are directly connected to the force converging point, FIG. 2 is an enlarged view of a paravane bridle assembly where a lever arm of the rope type is inserted, thereby being particularly suited for the device of the present invention;

FIG. 3 shows a paravane cascade solution for a wide tow seismic array without a lever arm, FIG. 4 is a close-up view of the bridle of FIG. 2, FIG. 5 is "an exploded" view in perspective of a connecting device according to the invention, for replacing the conventional fibre rope type of the lever arm, or insertion in a compact connection of the bridle, and FIG. 6 is a perspective view of the assembled device of FIG. 5.

The marine seismic survey arrangement shown in FIG. 1 is of the prior art streamer type and is given the reference numeral 1. Said arrangement 1 is already discussed in the prior art section above and is therefore just briefly summarised here. A vessel 2 is towing an array 6 of parallel streamers 8, and front paravanes 12 (only one is shown), one at each forward corner of the array, pull the streamers 8 laterally apart, that is transverse to the towing direction of the vessel 2. A conventional separation or super wide rope 14, 22, comprising several tethers 14, each between the forward end of every two neighbour streamers 8, and an outermost part 22, is thereby tensioned. In this way a fairly constant distance between the streamers 8 is maintained. To guide the paravanes 12 and distribute the towing and separating forces, the so called bridle 16 in the form of a rope array or assembly is arranged between each of these forward paravanes 12 and the individual ends of the following cables/ropes: The outermost lead-in cable 18, the tow rope (the spur line) 20 outside said cable 18, the outermost tether 14 and the corresponding streamer 8. The outermost part 22 of the super wide rope is connecting the ends of said lead-in cable 18 and the tow rope 20 and is thereby a central part of the bridle 16. These bridle ropes are dimensioned to withstand high tensile forces. Further paravanes and corresponding tethers making transverse strings may be arranged in a similar way as the forward ones, at given positions along the streamers 8 of the array 6, although not illustrated. The number of deflecting paravanes and tether strings may be chosen dependent upon the expected survey accuracy over time and covered area, the number of and distance between the streamers, their lengths and the expected weather and sea condition.

A number (seven in the drawing that only covers the starboard half of the array 6) of tow lead-in cables 18 are connected between the vessel 2 and the streamers 8 for towing them, supply their acoustic sensors with electric power and provide means for communication with the seismic equipment onboard.

FIG. 2 shows in an enlarged view—as already mentioned in the prior art section—another version of the bridle 16 and its force converging point 17 at the joining ends of the outermost part 22 and the tow rope 20 or spur line, in that the connecting lever arm rope 24 is inserted between said joining ends and the paravane 12 through its fastening wires or ropes 23.

FIG. 3 is a schematic view of a similar version of the bridle 16 as the one in FIG. 1, but where the paravane arrangement is different. By the illustrated cascading of two paravanes, the second one is towing the outermost streamer 8 and takes some of the required lateral "lift" so that the dimensioning of the first one can be relaxed.

FIG. 4 is a close-up view (not to scale) of a lever arm rope 24 and its force converging connections of the "soft splice" type. The converging point 17 is indicated in the middle of the left connection, normal to the paper plane.

FIG. 5 illustrates a preferred embodiment of the device 26 of the invention, in disassembled state. The device 26 is in the form of a solid connection link or member and preferably made of non-corrosive high quality metal or steel having great strength. Said device or member 26 comprises a central massive bar 28 and at least one plate 30 mounted rotatable several degrees about a first pivot axis 32 at one end of said bar 28. In a preferred version the member 26 carries two such plates 30A, 30B, each having a triangular form and mounted one above the other so as to give space for at least one inserted sheave 33 there between. In a typical and preferred version there are two inserted sheaves 33A, 33B between the two triangular plates 30A, 30B, one at each two outer corners 34A, 34B, 35A, 35B of the triangular shape of each plate, opposite the third corner 34C, 35C used for the mounting to the solid bar 28, and where the plates 30A, 30B at either side are equal. The first pivot axis 32 at this one or first end of the bar 28 allows the member 26 to align with the sum of the vector forces from the outermost part 22 of the super wide rope and the tow rope or spur line 20 at this end and makes the insertion of a simple but strong eye splice easy for their connections. At the other end of the bar 28 is hinged a multiple clevis fastener 37 particularly suited for the preferred fastening of the paravane ropes 23, usually in the number of two or three, in a strong clevis arrangement that can move about a second pivot axis 36 for allowing the bar 28 of the member 26 to align with the sum of the vector forces from the paravane through its ropes 23.

The use of the device 26 in the form of a link or member according to the invention and having hinged end plates 30 and a fastener 37, respectively, therefore results in a stable setup for the paravanes 12 of the survey array 6, now involving the fact that the lever arm is dramatically shortened relative to the earlier rope version of said arm 24.

The pivot axis 32 and 36 are embodied by the use of pin joints 39 that act as hinge elements and allow a sufficient rotation about each pivot axis, and bending forces on the link member 26 are therefore avoided.

As the lever arm in the form of a short link 26 now will have a central position in a corresponding more compact bridle 16 assembly, there is no longer a need for a risky recovering over the overboard sheave, as each paravane 12 can be hoisted separately up to a suitable level corresponding to an actual point for the winch for the super wide rope 14, 22.

FIG. 6 illustrates the device 26 fully assembled, in an embodiment having two sheaves 33 and a clevis fastener 37 with two rope clamps 38. The converging point 17 indicated in FIGS. 1-4 is so to speak taken over from the end joint or connection between ropes and moved to within the solid link member 26, namely on the first pivot axis 32, centrally within the first end of the bar 28. Similarly a second converging point (not indicated) is captured from the paravane ropes and positioned on the second pivot axis 36, also centrally within the bar 28.

Above is described how a device of the invention can replace the lever arm rope 24 in a paravane bridle 16. However, in seismic arrays not using such a lever arm (shown in FIGS. 1 and 3), it is equally possible and in fact recommendable to insert the new device as a convenient such lever arm in order to benefit by an increased life time and higher reliability. Also when planning new seismic arrays the device should naturally be taken into account for also saving costs and disassembling/assembling efforts.

Further there are also other connections where a device of the above described type may find a suitable use in its various embodiments, namely where bending forces are to be reduced or avoided, rope and wire solutions to be replaced, forces to be handled more safely and a mounting and dismantling to be made more easily. For such applications also embodiments not expressively shown in the drawings but covered by the description and the disclosures in the patent claims below, will be an integrated part of the invention.

LIST OF REFERENCE NUMERALS 1 survey arrangement/system
2 towing seismic vessel
4 acoustic sources
6 survey streamer array
8 streamers
9 stretchable rope or streamer
10 acoustic sensors
12 paravane
14 tethers forming the spreader or super wide rope 14, 22
16 bridle (array of ropes)
18 lead-in cables
20 (outermost) tow rope forming a spur line
22 (outermost) part/end of spreader/super wide rope
23 paravane fastening ropes
24 lever arm rope, conventional
26 device in the form of a connecting link or member (the inventive piece)
28 massive bar
30 A,B plate, triangular
32 1. pivot axis
33 A,B sheaves
34,35 A,B,C corners of plates
36 2. pivot axis
37 clevis
38 fastener rope clamps of clevis
39 pin joints

The invention claimed is:

1. A marine seismic survey apparatus employing seismic equipment comprising:
   an array streamers;
   lead-in cables and an outermost tow rope for towing said array of streamers,
   paravane for keeping the streamers at a given mutual distance by lateral tensioning, and
   a bridle unit for connecting the paravane to the array of streamers, the lead-in cables and the outermost tow rope,
   wherein said bridle unit comprise at least one solid link device designed for a releasable connection to lines under tension and extending in different directions, and
   said link device comprising a central bar having at one end at least one rotatable plate carrying at least one sheave and configured for the insertion of eye splices, and at the other end a hinged multiple fastener configured for fastening paravane ropes, thereby allowing the bar to align with a sum of vector forces present in connected ropes or cables at either bar end.

2. The apparatus according to claim 1, wherein said link device is adapted for a releasable connection to lines made of high strength man-made fiber ropes.

3. The apparatus according to claim 1, further comprising:
   the fastening ropes connecting the paravane to the hinged multiple fastener,
   a spreading rope having a plurality of tethers, and an outermost part extending to the bridle unit, and
   said link device is corresponds to a force converging point, between the outermost part of the spreading rope, the outermost tow rope and the paravane fastening ropes, thereby establishing a releasable link.

4. The apparatus according to claim 3, wherein the releasable link has a connection distance of less than 1.5 m.

5. The apparatus according to claim 3, wherein the releasable link has a connection distance of less than 0.75 m.

6. The apparatus according to claim 1, further comprising:
   fastening ropes fixed between the paravane and the hinged multiple fastener,
   a spreading rope having a plurality of tethers and an outermost part (22) extending to the bridle unit, and
   said link device is adapted for the replacement of a lever arm rope, thereby reducing a connecting distance between the streamers and the paravane.

7. The apparatus according to claim 6, wherein the connection distance is reduced from between 3 and 30 m to a value of less than 1.5 m.

8. The apparatus according to claim 6, wherein the connection distance is reduced from between 3 and 30 m to a value of less than 0.75 m.

9. The apparatus according to claim 1, wherein said rotatable plate is comprising two triangular plates at one end, said plates carrying two sheaves there between and adapted for the fastening of a lead-in cable and the outermost tow rope and that the hinged multiple fastener at the other end is of the clevis type and comprises two rope clamps, each adapted for the fastening of one of at least two paravane ropes.

10. The apparatus according to claim 1, wherein said link device is comprising two triangular plates at one end, said plates carrying two sheaves there between, one of which being adapted for the fastening to the outmost part of the spreading rope while the second one being adapted for the fastening to the aft end of a lead-in cable, and that the hinged multiple fastener at the other end of the link device comprises two rope clamps, each adapted for the fastening of a tether and a streamer, respectively.

11. A connecting device for connecting a paravane to a streamer and a wide tow rope, the connecting device comprising:
   a central bar having first and second ends;
   at least one rotatable plate attached to the first end of the central bar, the rotatable part being configured to carry first and second sheaves;
   two clamps attached to the second end of the central bar;
   wherein the first sheave is connected to the streamer;
   the second sheave is connected to the wide tow rope, and
   the first and second clamps are connected to the paravane.

12. The connecting device of claim 11, wherein the first and second clamps are hinged together to the second end of the central bar so that the first and second clamps rotate about the second end.

13. The connecting device of claim 11, further comprising:
   another rotatable plate attached to the first end of the central bar and sandwiching together with the at least one rotatable plate the first and second sheaves.

14. The connecting device of claim 11, wherein the streamer includes plural receivers configured to record seismic data.

15. A method for connecting a paravane to a streamer and a wide tow rope for a seismic marine system, the method comprising:
   attaching at least one rotatable plate to a first end of a central bar, the rotatable part being configured to carry first and second sheaves;
   attaching two clamps to a second end of the central bar;
   connecting the first sheave to the streamer;
   connecting the second sheave to the wide tow rope; and
   connecting the first and second clamps to the paravane.

16. The method of claim 15, wherein the first and second clamps are hinged together to the second end of the central bar so that the first and second clamps rotate about the second end.

17. The method of claim 15, further comprising:
   attaching another rotatable plate to the first end of the central bar to sandwich together with the at least one rotatable plate the first and second sheaves.

* * * * *

UNITED STATES PATENT AND TRADEMARK OFFICE
CERTIFICATE OF CORRECTION

| | | |
|---|---|---|
| PATENT NO. | : 8,619,496 B2 | Page 1 of 1 |
| APPLICATION NO. | : 13/817311 | |
| DATED | : December 31, 2013 | |
| INVENTOR(S) | : Hartland | |

It is certified that error appears in the above-identified patent and that said Letters Patent is hereby corrected as shown below:

In the Specification

In Column 5, Line 4, delete "30 in," and insert -- 30 m, --, therefor.

In Column 5, Line 49, delete "invention;" and insert -- invention, --, therefor.

In the Claims

In Column 8, Line 19, in Claim 1, delete "paravane" and insert -- a paravane --, therefor.

In Column 8, Line 53, in Claim 6, delete "part (22) extending" and insert -- part extending --, therefor.

Signed and Sealed this
Thirty-first Day of March, 2015

Michelle K. Lee
*Director of the United States Patent and Trademark Office*